(12) United States Patent
Withrow et al.

(10) Patent No.: US 10,603,968 B2
(45) Date of Patent: Mar. 31, 2020

(54) LOCKING ADJUSTABLE VEHICLE HITCH (71) Applicant: 1UPUSA.COM, LLC, Dickeyville, WI (US)

(72) Inventors: Ryan P. Withrow, Platteville, WI (US); Robbie T. Lange, Cuba City, WI (US)

(73) Assignee: 1UP USA.COM, LLC, Dickeyville, WI (US)

( * ) Notice: Subject to any disclaimer, the term of this patent is extended or adjusted under 35 U.S.C. 154(b) by 156 days.

(21) Appl. No.: 15/827,821

(22) Filed: Nov. 30, 2017

(65) Prior Publication Data

US 2019/0160899 A1    May 30, 2019

(51) Int. Cl.
*B60D 1/44* (2006.01)
*B60D 1/58* (2006.01)
*B60D 1/48* (2006.01)
*B60R 9/06* (2006.01)
*B60D 1/60* (2006.01)

(52) U.S. Cl.
CPC .................. *B60D 1/44* (2013.01); *B60D 1/48* (2013.01); *B60D 1/583* (2013.01); *B60D 1/60* (2013.01); *B60R 9/06* (2013.01)

(58) Field of Classification Search
CPC ............. B60D 1/44; B60D 1/48; B60D 1/583
USPC ....................................................... 280/467
See application file for complete search history.

(56) References Cited

U.S. PATENT DOCUMENTS

| | | | |
|---|---|---|---|
| 5,322,315 A | 6/1994 | Carsten | |
| 5,727,805 A | 3/1998 | La Roque | |
| 5,881,937 A * | 3/1999 | Sadler | B60R 9/06 224/509 |
| 6,406,051 B1 * | 6/2002 | Phillips | B60D 1/145 280/491.1 |
| 6,829,915 B1 | 12/2004 | Li | |
| 6,835,021 B1 | 12/2004 | McMillan | |
| 6,902,181 B1 | 6/2005 | Dye | |
| 6,951,287 B1 | 10/2005 | Randazzo | |
| 7,568,718 B1 | 8/2009 | Thomas | |
| 7,635,247 B2 | 12/2009 | Collins | |
| 7,909,350 B1 * | 3/2011 | Landry | B60D 1/06 280/416.1 |
| 8,091,913 B1 | 1/2012 | White | |
| 8,262,121 B2 | 9/2012 | Beck | |
| 8,696,011 B2 | 4/2014 | Despres | |
| 8,944,516 B2 | 2/2015 | Eidsmore | |

(Continued)

*Primary Examiner* — Jacob D Knutson
(74) *Attorney, Agent, or Firm* — Erin Ella Block; Charles S. Sara; DeWitt LLP (57) ABSTRACT A locking adjustable trailer hitch system includes a vehicle trailer hitch receiver having a receiver opening. The vehicle trailer hitch receiver includes at least one hitch pin opening for placement of a locking hitch pin. A locking adjustable trailer hitch bar is slidably and removably attached to the trailer hitch receiver through the receiver opening. The trailer hitch bar includes at least one extended slotted depression alongside one of its walls. The slotted depression is adapted to be in alignment with the hitch pin opening and can be a pass through or non-pass through depression. The hitch system further includes an anti-wobble device to secure and stabilize the hitch bar within the vehicle receiver. The hitch bar can extend along the length of the slotted depression such that the distal end of the hitch bar can be positioned a greater or lesser distance from the receiver as desired.

2 Claims, 6 Drawing Sheets

(56) References Cited

U.S. PATENT DOCUMENTS

| | | |
|---|---|---|
| 9,027,950 B2 | 5/2015 | Lahn |
| 10,099,525 B1* | 10/2018 | Phillips .................... B60D 1/26 |
| 2006/0170180 A1* | 8/2006 | Collins .................... B60R 3/02 |
| | | 280/166 |
| 2006/0255562 A1* | 11/2006 | Lantaigne ................ B60D 1/06 |
| | | 280/506 |
| 2007/0080516 A1 | 4/2007 | Simmons |
| 2010/0164196 A1* | 7/2010 | Collins .................... B60R 3/02 |
| | | 280/166 |
| 2013/0334792 A1 | 12/2013 | Pell |
| 2014/0117646 A1* | 5/2014 | Dekarske ............... B60D 1/065 |
| | | 280/512 |
| 2016/0001711 A1 | 1/2016 | Hughes |

* cited by examiner

FIG. 11

LOCKING ADJUSTABLE VEHICLE HITCH

FIELD OF THE INVENTION

The present invention is directed to an adjustable trailer hitch system for attaching a bicycle or similar structure to a trailer hitch on a vehicle. The present invention is specifically directed to an adjustable trailer hitch design which allows the user to extend the trailer hitch bar out to accommodate obstructions in the rear of the vehicle, inhibit removal of the trailer hitch bar from the trailer hitch receiver, and utilize an anti-wobble mechanism to frictionally secure the trailer hitch bar at any point along the trailer hitch receiver and to inhibit unnecessary movement of the trailer hitch bar within the trailer hitch receiver.

BACKGROUND

Bicycle racks, which can be removably attached to a vehicle, are well known to art. These can take the form of racks which are typically mounted to the rear end of a vehicle by mounting straps or racks which include a trailer hitch situated at the rear of a vehicle generally in or underneath the rear bumper. In this manner, the bicycle rack includes a trailer hitch post which includes a standard hitch mechanism, known to the art, for slidably inserting and attaching the distal end of the trailer hitch post to the trailer hitch secured to the vehicle.

Current bike rack and hitch accessories allow for the unit to be locked into the receiver by passing a pin through a receiver pin hole and a trailer hitch through hole. In some instances, the bike rack or accessory may have additional holes for allowing different positions inside the receiver. This method allows for limited trailer hitch adjustability within the receiver.

When using a single or multiple through hole to secure a bike rack or hitch accessory into a receiver, this limits the number of positions allowed for the rack or accessory. As mentioned above, if a bike rack or hitch accessory needs to be located in a position that does not allow the unit hole and receiver hole to lineup, the locking feature is lost. Current art does not allow bike racks or accessories to combine through pin locking and unlimited receiver positions or the ability to adjust the trailer hitch bar to a desired length and lock it in place.

SUMMARY OF THE INVENTION

The present invention is directed to a bicycle rack hitching system that does not require the standard hole or slot for locking the trailer hitch bar in the vehicle receiver. The present invention allows any inserted hitch assembly of a bicycle or accessory to be adjustable, in or out of the receiver, while still being secured with a locking mechanism. In conjunction with the adjustability and locking, it will also include an anti-wobble mechanism.

Thus, the invention is directed to a locking adjustable trailer hitch system comprising a vehicle trailer hitch receiver, comprising a receiver opening, wherein the vehicle trailer hitch receiver includes at least one hitch pin opening for placement of a locking hitch pin; a locking adjustable trailer hitch bar for attachment to the trailer hitch receiver, wherein the trailer hitch bar is adapted to be slidably received in the receiver opening, wherein the hitch bar comprises a distal end, a proximal end, parallel side walls, a top wall and bottom wall, wherein trailer hitch bar comprises at least one extended slotted depression having a proximal end and a distal end, wherein the slotted depression is adapted to be in alignment with the hitch pin opening; and an anti-wobble device to secure and stabilize the hitch bar within the vehicle receiver; wherein the hitch bar can extend along the length of the slotted depression such that the distal end of the hitch bar can be positioned a greater or lesser distance from the receiver as desired, and wherein the locking hitch pin releasably locks the hitch bar to the receiver.

This design will allow the bike rack and hitch accessories to be locked with a pin while still being able to adjust in or out of the receiver. While including both of these features, it will also use an anti-wobble design to secure the unit into the receiver for stability.

The overall design uses a combination of anti-wobble mechanism and positive lock to allow the accessory to be located where design in the receiver. Without the pin and stopping feature, a positive lock does not exist and the anti-wobble must be depending on to hold the accessory in the receiver.

It is possible to combine the anti-wobble and the positive locking pin into one mechanism.

The objects and advantages of the invention will appear more fully from the following detailed description of the preferred embodiment of the invention made in conjunction with the accompanying drawings.

DETAILED DESCRIPTION OF THE INVENTION

Figure 1:
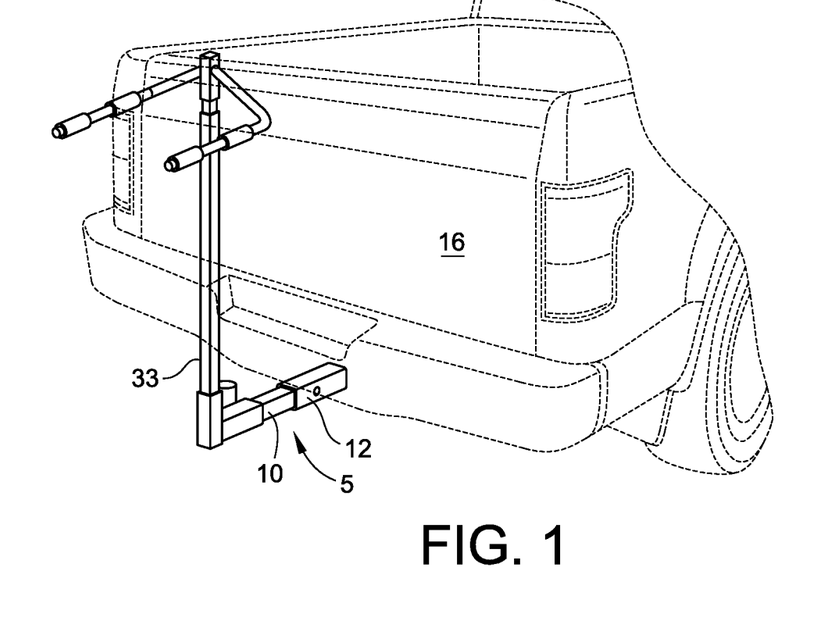
FIG. 1 is a partial perspective view of the rear end of a motor vehicle illustrating the locking adjustable vehicle hitch assembly in combination with a bicycle rack.
Figure 2:
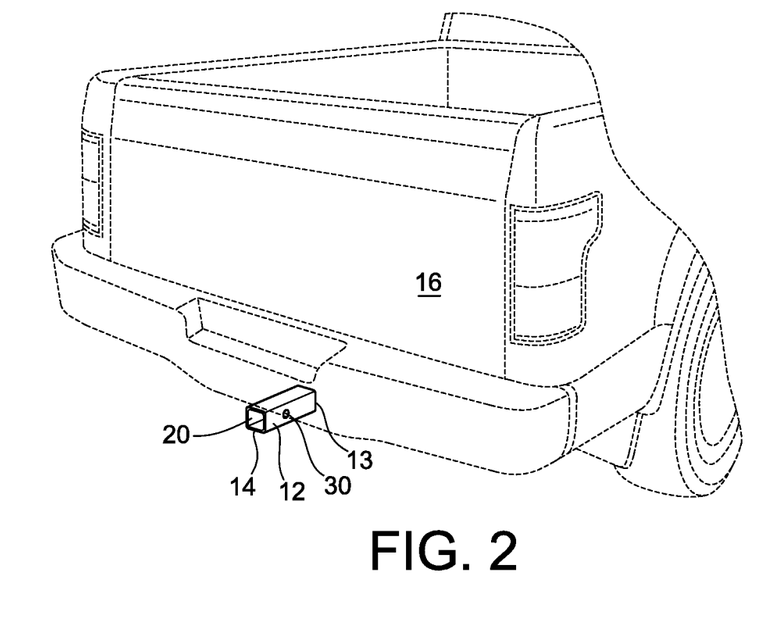
FIG. 2 is a perspective view of the rear end of the motor vehicle of FIG. 1 illustrating the trailer hitch receiver unit.

Referring now to the drawings and particularly FIG. 1, the present invention is directed to a trailer hitch-receiver unit 5, which includes a locking adjustable trailer hitch bar 10 for attachment to a standard trailer hitch receiver 12 of a vehicle 16, shown in phantom. As illustrated in FIG. 2, the trailer hitch receiver 12 has a receiver opening 20 to slidably receive the trailer hitch bar 10 to the trailer hitch receiver 12. Those skilled in the art will appreciate that various alternative hitch-receiver units may be employed without departing from the invention as claimed.

Figure 3:
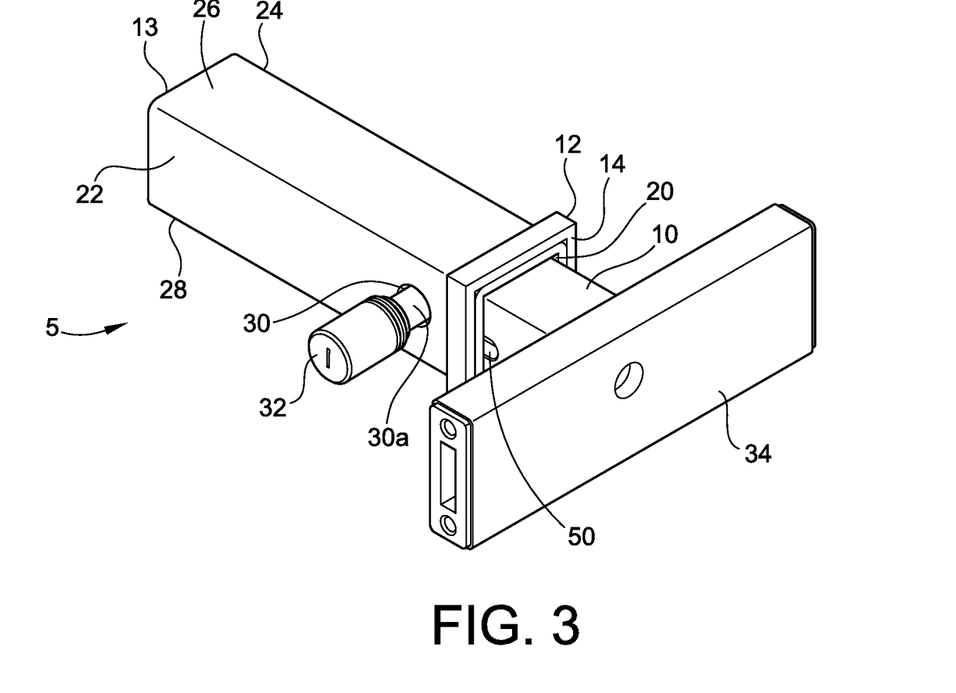
FIG. 3 is a front perspective view of a first embodiment double slot or through slot locking adjustable trailer hitch assembly of the present invention.

Vehicle Receiver 12:

As illustrated in FIG. 3, the trailer hitch receiver opening 20 is formed within the receiver 12 by parallel side walls 22, 24 spaced by a top wall 26 and bottom wall 28. The receiver 12 has a proximal end 13 attached to the vehicle 16 and a distal end 14. The receiver 12 has an opening 20 at the distal end 14 as illustrated in FIG. 2. The opening 20 is usually available in the following sizes: 1¼", 2", 2½" and 3", although other sizes can be contemplated. This design is not specific to size, but rather is available for all. The vehicle receiver 12 is typically made of square metal tubing with the previous dimensions being the inside dimension. As will be described in detail below, the receiver 12 will have at least one and sometimes multiple through hitch pin openings 30 typically placed on the side walls 22, 24 of the receiver 12. The hitch pin openings 30 allows for the placement of a hitch pin 32.

Hitch Bar 10:

The hitch bar 10 is the component that connects the accessory, such as a bike rack 33 or attachment plate 34 to the vehicle 16. The hitch bar 10 is typically joined to the accessory by welding or fastening such as by screws. As illustrated in the figures, the hitch bar 10 is an extended bar having a distal end 36, a proximal end 38, parallel side walls 40, 42, a top wall 44 and bottom wall 46 in communication to form a square or rectangular shape for slidable placement within the opening 20 of the receiver 12. To match receiver opening 20 sizes, the dimensions of the hitch bar 10 are typically offered in 1.25" and 2.00." If the receiver opening 20 is a different size, it may be fitted with an additional "accessory" sleeve (not illustrated) to make up the difference between the size of the hitch bar 10 and the receiver opening 20. The hitch bar 10 is designed to be removably inserted within the receiver opening 20 of the vehicle receiver 12.

Slot 50 in Hitch Bar 10:

As illustrated in FIGS. 3-10, the hitch bar 10 includes an extended slotted depression or slot 50 generally formed on at least one of the side walls 40, 42 of the hitch bar 10, although the slot 50 can be placed on the top wall 44 or the bottom wall 46 if preferred. The slot 50 includes a defined proximal end 52 and distal end 54 and extends along the length of the hitch bar wall from the hitch bar proximal end 38 to the hitch bar distal end 36. As will be explained in the following paragraphs, the slot 50 may take on a number of variations. However, of importance is the fact that the slot 50 and the hitch pin opening 30 must be in alignment for placement of the hitch pin 32. The slot 50 on the hitch bar 10 is what allows for the adjustability of the hitch bar 10 with respect to the vehicle receiver 12. As can be seen in the figures, the slot 50 arrangement enables positioning of the hitch bar 10 such that the distal end 36 of the hitch bar can be positioned a greater or lesser distance from the distal end 14 of the receiver 12 as desired. As can be seen, the length of the slot 50 from the proximal end 52 to the distal end 54 is defined by the length of the hitch bar 10. Without wishing to be restricted to any set distances, a typical range of slot positioning can extend from 1 to 10 inches or more. The slot 50 is the main feature that allows the hitch bar 10 to lock in a wide range of positions with respect to the receiver 12.

Due to the action of the hitch pin 32 passing through the hitch pin opening 30 on the vehicle receiver and the slot 50 on the hitch bar 10, the hitch bar 10 is unable to be removed from the receiver 12 when the hitch pin 32 is properly placed thereon. As illustrated in FIGS. 3-10, the depression can take on various forms and embodiments.

First Embodiment—Through Slot

Figure 4:
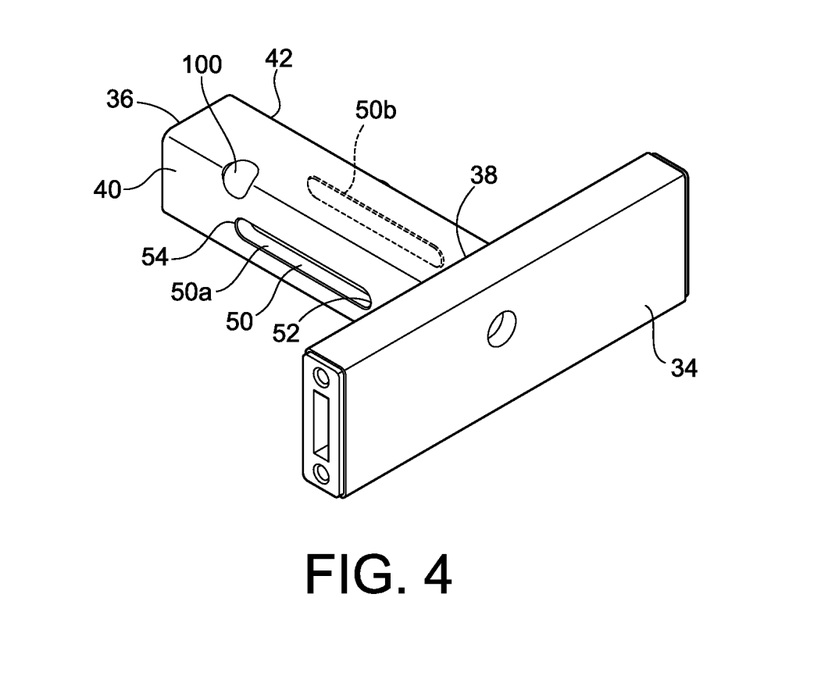
FIG. 4 is a front perspective view of the trailer hitch bar of FIG. 3.
Figure 5:
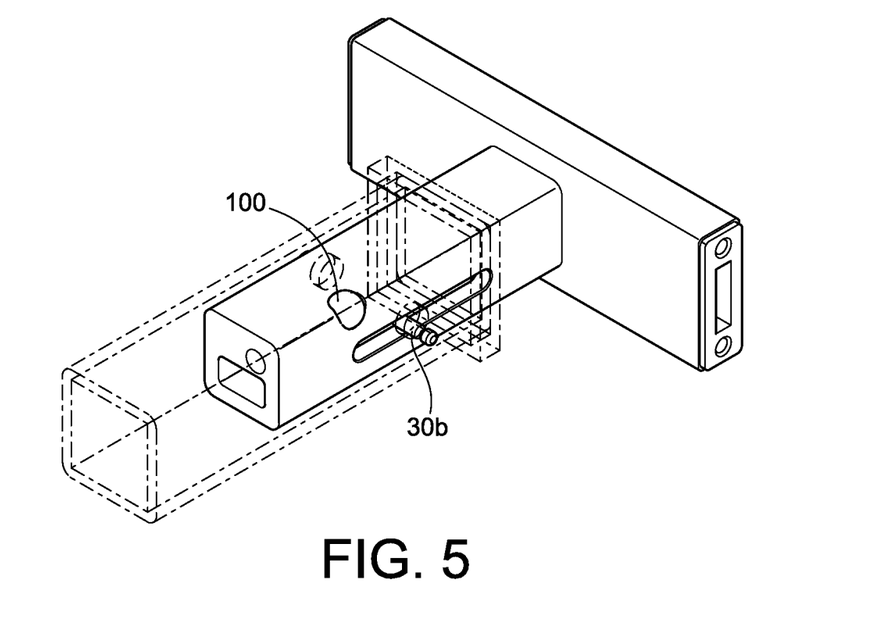
FIG. 5 is a rear perspective view of the locking adjustable trailer hitch assembly of FIG. 3.

Reference is made to FIGS. 3-5 for a hitch receiver unit 5 wherein the slot 50 takes the form of a pass-through slot system having a first extended slot 50a in sidewall 22 and a second extended slot 50b in sidewall 40, wherein the first extended slot 50a is aligned with the second extended slot 50b in sidewall 42 to enable the hitch pin 32 to pass through the hitch bar 10 as illustrated in FIGS. 3 and 5. The hitch receiver 12 also includes a pair of aligned receiver openings 30a, 30b. Receiver opening 30a is positioned on sidewall 22 and hitch pin opening 30b is positioned on sidewall 24. In this manner, the trailer hitch bar 10 can be slidably positioned within the receiver 12 such that the proximal end 38 of the hitch bar 10 can be spaced away from the distal end 14 of the receiver 12 at various increments along the slot system 50. As stated above, the hitch pin 32 effectively slidably locks the hitch bar 10 to the receiver 12.

Second Embodiment—Single Slot

Figure 6:
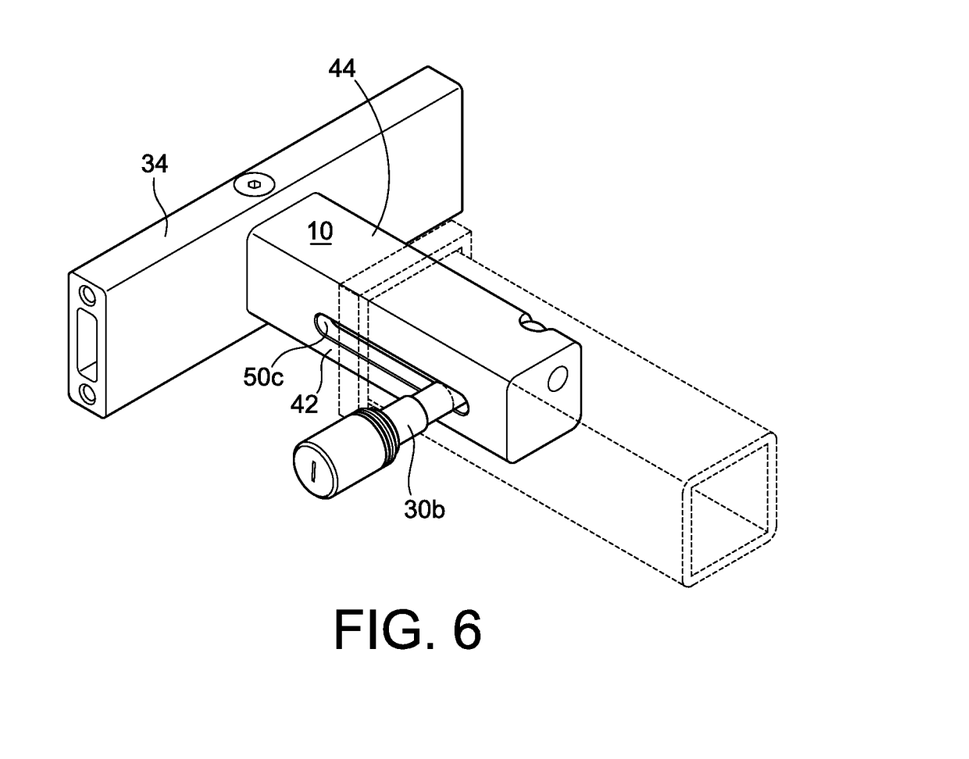
FIG. 6 is a rear perspective view of a second embodiment "single slot" locking adjustable trailer hitch assembly of FIG. 5.

Reference is made to FIG. 6 for a second embodiment of the slot system which comprises a single slot 50c positioned alongside one sidewall of the trailer hitch bar 10. As illustrated, the slot 50c is located on sidewall 42 of the trailer hitch bar 10. However, it is equally contemplated that the slot 50c could be placed on sidewall 40 or top wall 44 or bottom wall 46. Likewise, there is only one hitch pin opening 30b required in the receiver 12 for placement of the hitch pin 32.

Third Embodiment—Single Trough

Figure 7:
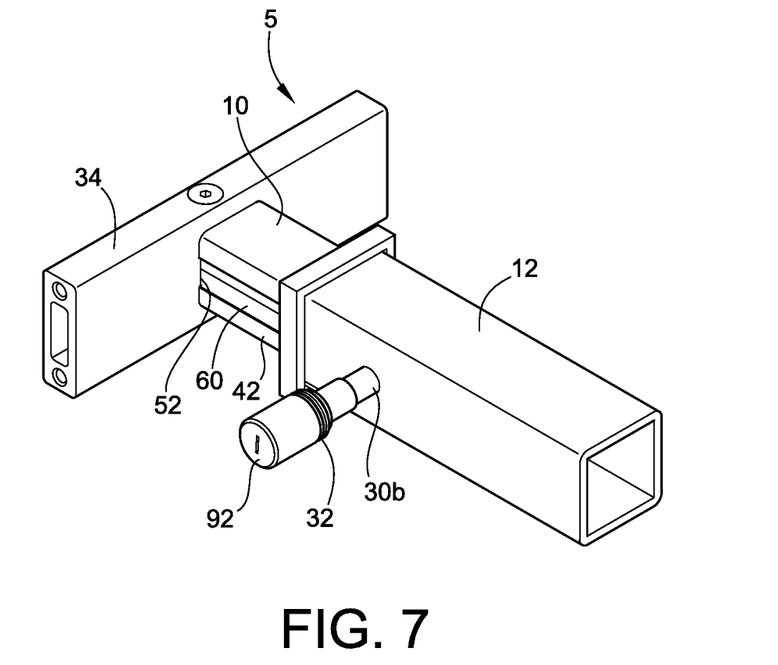
FIG. 7 is a rear perspective view of a third embodiment "single trough" locking adjustable trailer hitch assembly of the present invention.
Figure 8:
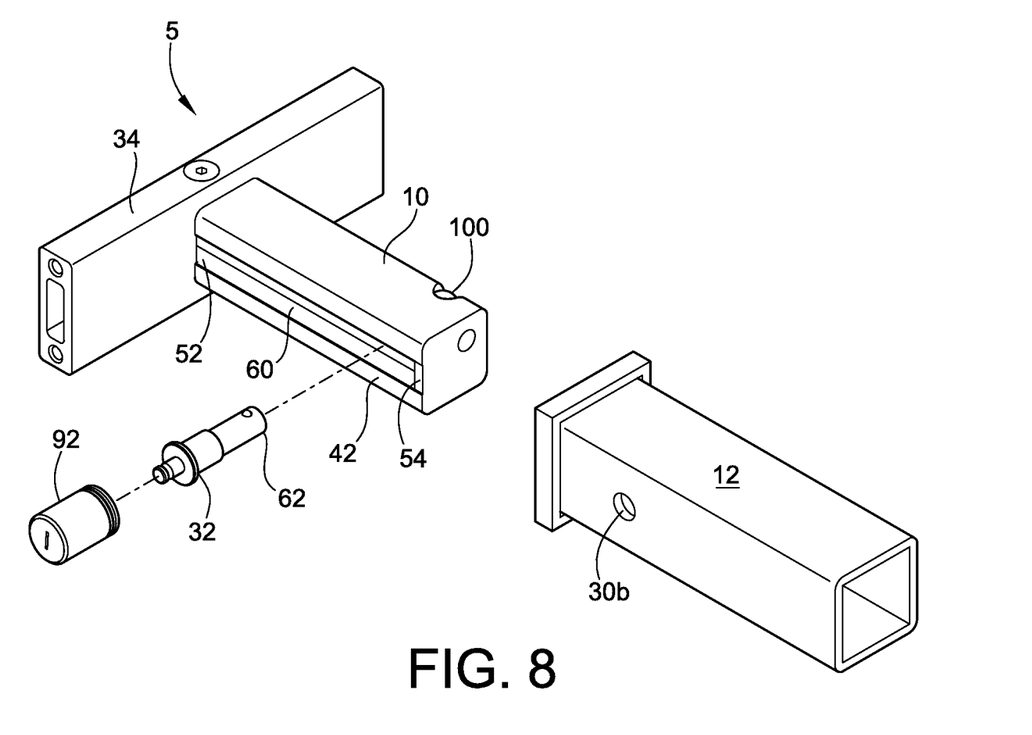
FIG. 8 is an exploded rear perspective view of the locking adjustable trailer hitch assembly of FIG. 7.

Reference is made to FIGS. 7 and 8 for a third embodiment of the slot system which comprises a single extended non-pass-through extended depression or trough 60 alongside one sidewall of the trailer hitch bar 10. Like the single slot system discussed above, the trough 60 is illustrated as being placed on sidewall 42 of the trailer hitch bar 10. However, it is equally contemplated that the trough 60 could be placed on sidewall 40 or top wall 44 or bottom wall 46. There is also only one hitch pin opening 30b required in the receiver 12 for placement of the hitch pin 32. Unlike the slot system 50 discussed above, the trough 60 does not penetrate through the sidewall 42. Rather, it is a scooped depression alongside the sidewall 42 as illustrated from the proximal end 52 to the distal end 54 of the trough 60. When assembled, as illustrated in FIG. 7, the hitch pin 32 is inserted through the receiver opening 30b and locked in place such that the end 62 penetrates beyond the surface of the side wall 42 and locks into the trough 60. In this manner, the trailer hitch bar 10 is effectively slidably locked onto the receiver 12.

Fourth Embodiment—Double Trough

Figure 9:
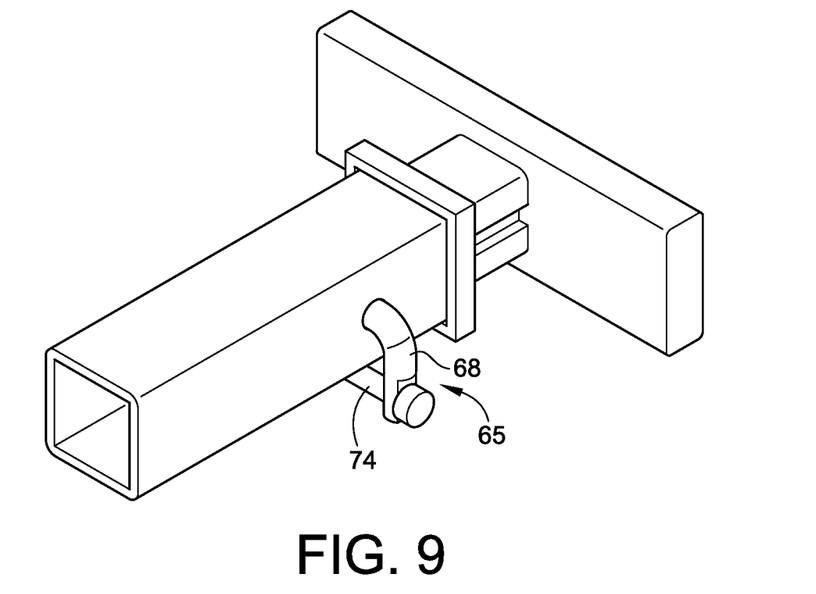
FIG. 9 is a rear perspective view of a fourth embodiment "double trough" locking adjustable trailer hitch assembly of the present invention.
Figure 10:
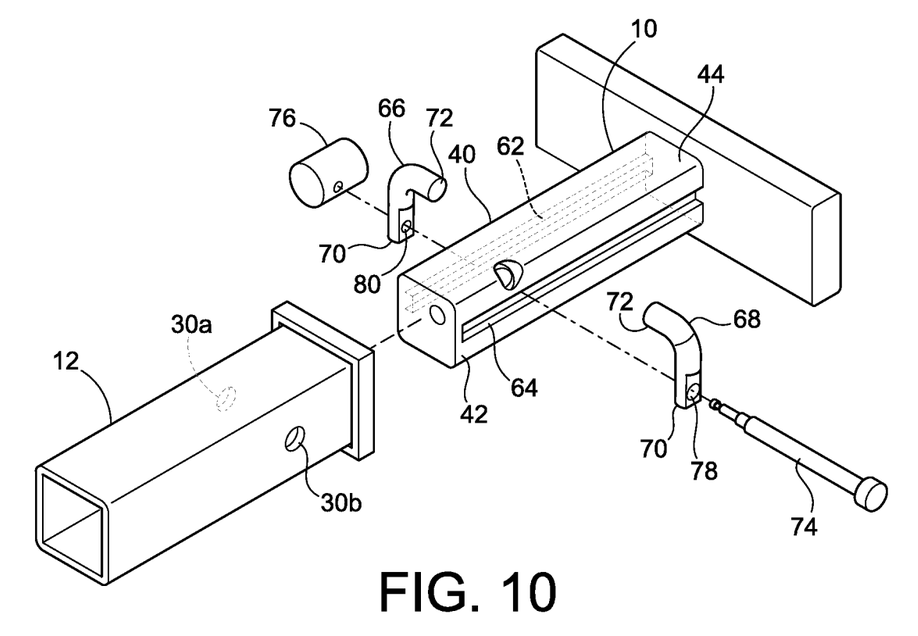
FIG. 10 is an exploded rear perspective view of the locking adjustable trailer hitch assembly of FIG. 9.

Reference is made to FIGS. 9 and 10 for a fourth embodiment of the slot system which comprises a double trough system wherein opposing non-pass-through depressions or troughs 62, 64 are placed on sidewalls 42, 44 respectively. The shape and dimensions of the troughs 62, 64 are similar to that described with respect to trough 60 above.

However, this embodiment requires opposing hitch pin openings 30*a*, 30*b* in each of sidewalls 42, 44. In this manner, the hitch bar 10 is slidably secured to the receiver 12 by a locking pin arrangement 65, known to the art, comprising opposing L-shaped locking pins 66, 68 having a proximal end 70 and a distal end 72. When assembled, as illustrated in FIG. 9, the distal ends 72 of the L-shaped locking pins 66, 68 are inserted through the receiver openings 30*a*, 30*b* such that the distal ends 72 penetrate beyond the surface of the side walls 42, 44 and lock into the troughs 62, 64 respectively. The L-shaped locking pins 66, 68 are then secured by a pin 74 and lock 76 mechanism, known to the art, wherein the pin 74 is inserted through openings 78, 80 at the proximal end 70 of the L-shaped locking pins 66, 68 and secured therein by the lock 76. As is known in the art, the lock 76 can be a standard releasable attachment device or it can include and combination or a key lock. In this manner, the trailer hitch bar 10 is effectively slidably locked onto the receiver 12.

Figure 8A:
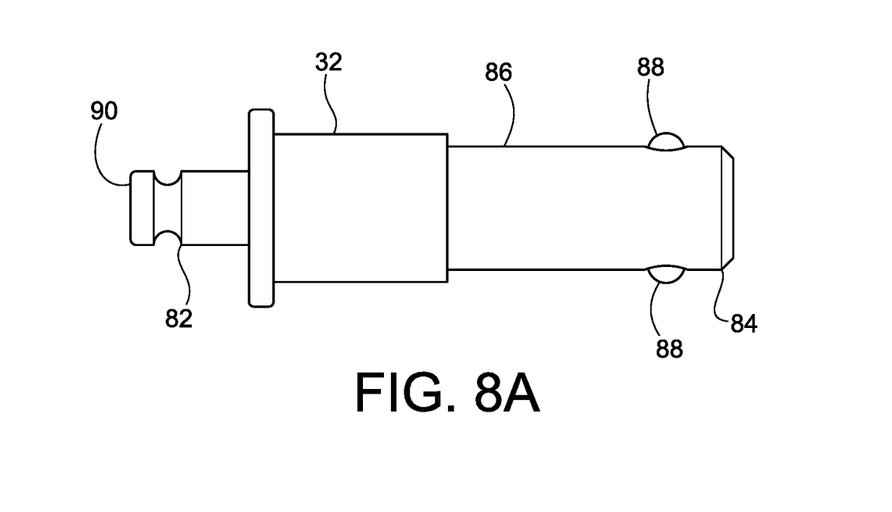
FIG. 8A is a side elevated view of the trailer hitch pin of FIG. 8.

Locking Pin 32:

The purpose of the locking pin 32 is to secure the trailer hitch bar 10 to the receiver 12 to prevent the trailer hitch bar 10 from separating from the receiver 12. The locking pin 32 is a standard receiver pin known to art for this purpose and can take many forms. As illustrated in FIGS. 8 and 8*a*, a typical locking pin 32 includes a proximal end 82 and a distal end 84. The distal end 84 passes through the receiver opening 30. Depending upon which slot embodiment is used, the distal end 84 may (1) pass through hitch pin openings 30 and slots 50*a*, 50*b* (first or through slot embodiment); (2) pass through one hitch pin opening 30 and slot 50*c* (second or single slot embodiment); or (3) pass through one hitch pin opening 30 where the distal end of the locking pin 32 enters the trough 60 (third or single trough embodiment; or (4) pass through opposing hitch pin openings 30*a*, 30*b*, by means of L-shaped locking pins 66, 68 (fourth or double trough embodiment). The action of the locking pin 32 locks the distal end 84 of the locking pin 32 in place with one or more hitch pin openings 30 such that the locking pin 32 cannot be retracted and the hitch pin 10 is slidably secured to the receiver 12 along the path of the slot 50. When the locking pin 32 is in place, the hitch bar 10 may be slidably moved along the length of the slot 50 until reaching either the proximal end 52 or distal end 54 of the slot 50. In this manner, the hitch bar 10 may travel along the length of the slot 50 in order to either extend the hitch bar 10 from the receiver 12 or retract the hitch bar 10 within the receiver 12. However, the range of movement of the hitch bar 10 is limited to the length of the slot 50. Further, the hitch bar 10 cannot be separated from the receiver 12.

As illustrated in FIG. 8A, one method of actuating the locking pin 32 involves the action of a spring pin (not shown) within the chamber 86. The spring pin actuates a set of expansion balls 88 near the distal end 84 that are actuated up and down with a push button 90 on the proximal end 82 of the locking pin 32. Once the locking pin 32 is inserted into the receiver hitch pin opening 30, the locking pin 32 cannot be retracted unless the push button 90 is compressed. In order to stop the push button 90 from being compressed, which locks the locking pin 32 within the receiver, a lock 92 can be added over the push button 90. Reference is made to FIGS. 7 and 8 for a representation of the lock 92. As illustrated, the lock 92 may be a key lock. However, other locks are contemplated.

In general, the hitch pin 32 is not intended to restrict the movement of the hitch bar 10 within the receive 12. The hitch pin 32 does, however, create an interference so that the hitch bar 10 cannot be removed from the receiver 12.

Figure 11:
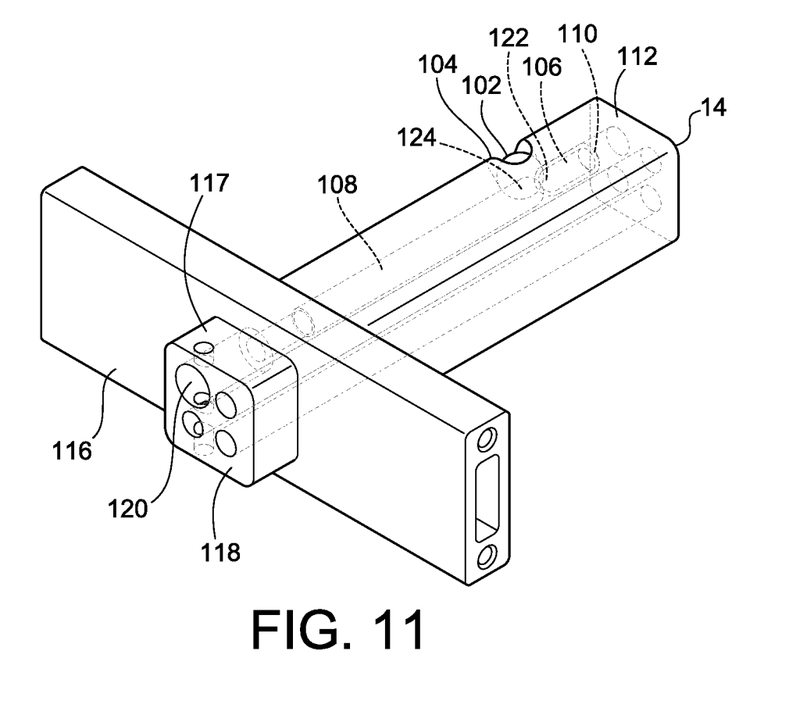
FIG. 11 is a front perspective view of the trailer hitch assembly of the present invention illustrating an anti-wobble mechanism.

Anti-Wobble Mechanism:

Reference is made to FIGS. 4, 5 and 11 for the anti-wobble device 100 of the present invention. Anti-wobble devices are known to the industry as devices used to stabilize the hitch bar 10 within the vehicle receiver 12 and secure the hitch bar 10 and tighten it in place within the receiver 12.

A representative anti-wobble device 100 is illustrated in FIG. 11. Referring to this figure, the anti-wobble device 100 includes a spherical or ball-shaped bearing 102 which is actuated at an intersecting edge of the side walls 22, 24 and the top 26 or bottom wall 28 of the receiver. As illustrated, the opening 104 is positioned on an intersecting edge between the side wall 42 and top wall 44 near the distal end 14 of the receiver 12 to emerge from a bearing opening 104. As illustrated in FIG. 11, the bearing 102 rests at the intersection of two horizontally positioned posts 106, 108 within the interior of the hitch bar 10. Post 106 is positioned such that its posterior end 110 is immobile and aligned with the back wall 112 of the hitch bar 10 at the distal end of the hitch bar 10. Elongated post 108 is positioned within the interior of the hitch bar 10 in alignment with post 106. The posterior end 110 of the post 106 is threadably positioned within a chamber 116 on the hitch bar 10 at the threaded location 117. Returning to the bearing 102, it is shown to rest on the conically shaped distal ends 122, 124 of the posts 106, 108. The head 118 of the post 108 preferably contains a slot 120 for receiving the end of a slotted screwdriver (not shown). By rotating the screwdriver within the slot 120, the post 108 can be urged such that the distance between the distal ends 122, 124 of posts 106, 108 can be decreased thereby elevating the bearing 102 through the bearing opening 104 or extended thereby drawing the bearing 104 within the interior of the hitch pin 10. By elevating the bearing 102 through the bearing opening 104, the bearing 102 will be urged against the interior surface of the retainer 12 thereby securing and stabilizing the hitch bar 10 into the receiver 12.

In this manner, the hitch bar 10 can be position at any length along the slot 50 to a preferred position. The locking pin 32 ensures that the hitch pin will be slidably secured with the receiver 12. The anti-wobble device 100 is then used to stabilize and secure the hitch pin 10 within the receiver 12 at the desired location along the slot 50. The friction caused by the anti-wobble device 100 against the interior wall of the receiver 12 will prevent the hitch pin 10 from sliding along the length of the slot 50.

While the above description illustrates a preferred anti-wobble device, there are other anti-wobble mechanisms which can be used, such as driving a round bearing or wedge into the corner of the receiver 12. This drives the hitch bar 10 down and to the side, tightening the hitch bar 10 into the receiver 12.

In addition, there are accessory options for use to tighten the hitch bar 10 into the receiver 12, such as a U-bolt and plate tightened on both the receiver 12 and the hitch bar 10 creating a stable connection. Other anti-wobble mechanism devices are known to exist for similar purposes and the present invention is not restricted to the device described herein.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated references, the present disclosure controls.

The devices, methods, compounds and compositions of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such process steps and materials may vary somewhat. It is also understood that the terminology used herein is used for the purpose of describing particular embodiments only and is not intended to be limiting since the scope of the present invention will be limited to only the appended claims and equivalents thereof.

What is claimed is:

1. A locking adjustable trailer hitch system comprising:
   a. a vehicle trailer hitch receiver, comprising a receiver opening, wherein the vehicle trailer hitch receiver includes at least one hitch pin opening for placement of a locking hitch pin system;
   b. a locking adjustable trailer hitch bar for attachment to the trailer hitch receiver, wherein the trailer hitch bar is adapted to be slidably received in the receiver opening, wherein the hitch bar comprises a distal end, a proximal end, parallel side walls, a top wall and bottom wall, wherein trailer hitch bar comprises at least one extended slotted depression having a proximal end and a distal end, further wherein the at least one extended slotted depression comprises a single pass-through slot positioned alongside one sidewall of the trailer hitch bar and wherein the single pass-through slot is aligned with the at least one hitch pin opening to enable the hitch pin to pass therethrough for slidable locking placement; and
   c. an anti-wobble device to secure and stabilize the hitch bar within the vehicle receiver; wherein the hitch bar can be releasably secured at various increments along a length of the slotted depression such that the distal end of the hitch bar can be positioned a greater or lesser distance from the receiver as desired, and wherein the locking hitch pin system releasably locks the hitch bar to the receiver.

2. A locking adjustable trailer hitch system comprising:
   a. a vehicle trader hitch receiver, comprising a receiver opening, wherein the vehicle trailer hitch receiver includes at least one hitch pin opening for placement of a locking hitch pin system;
   a locking adjustable trailer hitch bar for attachment to the trailer hitch receiver, wherein the trailer hitch bar is adapted to be slidably received in the receiver opening, wherein the hitch bar comprises a distal end, a proximal end, parallel side walls, a top wall and bottom wall, wherein trailer hitch bar comprises at least one extended slotted depression having a proximal end and a distal end, further wherein the at least one slotted depression comprises a double trough system including a first non-pass-through extended depression positioned alongside one sidewall of the trailer hitch bar and a second non-pass-through extended depression positioned alongside an opposing second sidewall of the trailer hitch bar, wherein the hitch receiver comprises at least one pair of aligned hitch pin openings, including the at least one hitch pin opening and a second hitch pin opening, such that the at least one pair of aligned hitch pin openings are aligned with the first and second non-pass-through extended depressions, and the locking hitch pin system comprising first and second locking pins releasably secured through the at least one pair of hitch pin openings such that the first locking pin interacts with the first non-pass-through extended depression and the second locking pin interacts with the second non-pass-through extended depression to slidably secure the hitch bar to the receiver; and
   c. an anti-wobble device to secure and stabilize the hitch bar within the vehicle receiver; wherein the hitch bar can be releasably secured at various increments along a length of the slotted depression such that the distal end of the hitch bar can be positioned a greater or lesser distance from the receiver as desired, and wherein the locking hitch pin system releasably locks the hitch bar to the receiver.

* * * * *